United States Patent Office 3,558,302
Patented Jan. 26, 1971

3,558,302
STABLE OIL-DITHIOCARBAMATE DISPERSIONS
Robert H. Salvesen, Clark, N.J., assignor to Esso Research and Engineering Company, a corporation of Delaware
No Drawing. Continuation-in-part of application Ser. No. 689,305, Dec. 11, 1967. This application Dec. 20, 1968, Ser. No. 785,743
Int. Cl. A01n 9/00, 9/02, 9/12
U.S. Cl. 71—97          5 Claims

ABSTRACT OF THE DISCLOSURE

Stable oil-dithiocarbamate formulations, methods for their formulation, and methods for their application to banana plants to increase banana yield. Preferred dispersions comprise a thixotropic system of manganese ethylenebisdithiocarbamate or mixtures thereof with zinc ethylenebisdithiocarbamate or a source of zinc ion in oil in which there are also contained small amounts of lecithin, water, and an emulsifier, such as an alkylated aryl polyether alcohol like Triton X–155, Triton X–100, Triton X–45, etc., or a sorbitan monolaurate polyoxyethylene derivative, such as Tween 60 to enable the final dispersions to have viscosities ranging from about 2,000 to about 50,000 cps. at temperatures of between about 60° and 120° F.

CROSS-REFERENCE TO OTHER APPLICATIONS

This application is a continuation-in-part of Robert H. Salvesen copending U.S. patent application Ser. No. 689,305, filed Dec. 11, 1967, now abandoned.

FIELD OF THE INVENTION

This invention relates to novel dithiocarbamate compositions comprising novel stable dithiocarbamate-oil concentrates or dispersions, methods for their preparation, and methods for their application to a variety of crops such as field crops of tobacco, coffee, olives, etc., vegetable crops of potatoes, tomatoes, beans, etc.; fruit crops of apples, peaches, grapes, bananas, etc.; to increase the yields thereof. More particularly, this invention relates to thixotropic systems, concentrates, or dispersions comprising a finely divided dithiocarbamate (hereinafter referred to as Maneb), a mixture of Maneb with zinc ethylenebisdithiocarbamate (hereinafter referred to as Zineb), or a mixture of Maneb with a source of zinc ion such as a zinc salt suspended in a hydrocarbon fraction such as a spray oil in which there are contained small amounts of other materials such as a dispersant, e.g., lecithin; water; and an emulsifier, such as an alkylated aryl polyether alcohol like Triton X–155, Triton X–100, Triton X–45, etc., or a sorbitan monolaurate polyoxyethylene derivative, such as Tween 60; to enable the final concentrate, dispersion or thixotropic system to have a viscosity ranging from about 2,000 to about 50,000 cps. at temperatures ranging from between about 60° to about 120° F.

PRIOR ART

The use of finely-divided water-insoluble solid Maneb as a pesticide, including its use as a fungicide, of course, is well known. These materials are commonly marketed as powders that are formulated into sprayable compositions by suspending them, with mild agitation, in water containing a dispersant. Thixotropic systems of such pesticidal suspensions are also known. For example, U.S. 2,089,612 discloses an aqueous mixture containing 20–50% by weight of water in which a pesticide of copper oxychloride is suspended. Thixotropic compositions having utility as pesticides and containing a dithiocarbamate suspension, including zinc ethylenebisdithiocarbamate and/or Maneb, are also known, as is shown, for example, by U.S. Pats. 2,870,058 and 2,870,059.

However, in order to make thixotropic compositions of these known prior art suspensions, special techniques have been required heretofore. For example, the suspensions disclosed in U.S. 2,870,058 have required the use of suspending agents, such as Bentone, and very vigorous shearing action to form a thixotropic system since, as disclosed in U.S. 2,870,059, dithiocarbamates, in general, and ethylenebisdithiocarbamates in particular form slurries in water that, for the most part, are not truly thixotropic in nature.

That preparation of thixotropic systems of oil-dispersible, water-insoluble salts of dithiocarbamic acid is not readily accomplished except through the use of specialized techniques is shown in U.S. 3,131,119 where high shear and polymers are required to disperse the dithiocarbamate pesticide in the oil system. Use of other polymers, such as copolymers prepared from a mixture of vinyl pyrrolidone, stearyl methacrylate, lauryl methacrylate, and butyl methacrylate, along with other materials such as glass, cellulose, asbestos, and synthetic organic fibers, as suspending agents to aid in the dispersion of pesticides in oil is shown in U.S. 3,171,779.

In addition, U.S. 3,060,084 shows that judicious selection of the suspending agent to be used is important to the degree of thixotropic success to be obtained. This patent discloses use of thickeners or suspending agents, e.g., low viscosity methyl cellulose, Elvanol (polyvinyl alcohol), carboxymethylcellulose, etc., and asserts that extremely high shear of its aqueous pesticides, having appropriate thickener therein, is necessary for preparing the appropriate thixotropic system.

Heretofore, there have not been available in the prior art, stable, thixotropic oil-dithiocarbamate dispersions that could be prepared without extreme grinding or shearing action and/or the use of additives such as polymer or suspening agents as thickeners. The present invention now enables the art to fill this void in this regard.

SUMMARY OF THE INVENTION

It has now been found that stable thixotropic dithiocarbamate-oil formulations, e.g., concentrates, dispersions, or systems useful for increasing yields of such diverse crops as bananas, coffee, olives, citrus, apples, pears, grains, tomatoes, potatoes, melons, beans, etc., can be readily prepared without need of polymers or suspending agents, or excessive time-consuming grinding or shearing, requiring the use of expensive milling equipment.

The ease of formulation with which the oil-Maneb-containing compositions of this invention can be prepared by the present method of formulation makes it possible to prepare them in such simple equipment as a cement mixer, rotating barrel, simple agitator or stirrer, etc.; accordingly, the costs of formulation are very reasonable. Moreover, small concentrations (e.g., 1.0% or less) of low cost ingredients are satisfactory to produce a stable end product formulation.

In accordance with a preferred embodiment of this invention, there is now provided an improved stable thixotropic dithiocarbamate-oil formulation, e.g., system, concentrate, or dispersion, comprising (1) a hydrocarbon fraction, preferably a hydrocarbon spray oil; (2) an active dithiocarbamate ingredient, preferably Maneb or mixtures thereof with Zineb or a source of zinc ion such as a zinc salt; (3) a dispersant, preferably lecithin or a derivative thereof; (4) an emulsifier, a preferable source of which is an ordinary commercial surfactant, such as an alkylated aryl polyether alcohol like Triton X–155, Triton X–100, Triton X–45, etc.; and (5) water. In order to obtain stable thixotropic oil-Maneb-containing dispersions that are not subject to the disadvantages previously encountered in the prior art, however, it is critical to the success of the present dispersions or formulations that their ingredients be kept carefully within certain critical proportions and levels of concentration so that viscosities of the final dispersions in the range of from about 2,000 to about 50,000 c.p.s., at temperatures of between about 60° F. to about 120° F., particularly 80° F., can be obtained.

Thus, the improved dithiocarbamate-oil formulations, concentrates, dispersions, or systems, etc., of this invention comprise from about 20 to about 65% by weight, preferably about 35 to about 45% by weight of the hydrocarbon fraction; about 35 to about 65% by weight, preferably about 55 to about 60% by weight of dithiocarbamate; about 0.5 to about 10.0% by weight, preferably about 0.75 to about 5.0%, and most preferably about 0.75 to about 2.0% by weight of the dispersant lecithin; about 0.1 to about 1.0% by weight, preferably about 0.15 to about 0.5% by weight, of the emulsifier; and about 0.1 to about 2.0% by weight, preferably about 0.5 to about 1.5% by weight, of water.

The concentrated dithiocarbamate-oil formulations of this invention can be diluted with from about 2 to about 50 parts, and preferably 5 to 20 parts, by weight of a hydrocarbon fraction having the same general characteristics as the hydrocarbon component of the concentrated formulation. Hydrocarbon fractions having somewhat different characteristics than the hydrocarbon fraction in said formulation can be employed as the hydrocarbon diluent without adversely affecting the activity of the suspended pesticide in the resultant diluted formulation, provided that the oil is suitable for use on the desired crop. Any number of non-phytotoxic oils suitable for use on crops may be used as diluents for this formulation. In general such oils are naphthenic and paraffinic fractions of low volatility having viscosities in the range of 40–200 SUS at 100° F. such as Orchex 696, 792, 796; Texaco 796 Oil; etc. Oils having high percentages of unsaturated hydrocarbons are known to cause injury to trees and plants.

Suitable dithiocarbamates that are useful in obtaining the benefits derived from practice of this invention include manganese ethylenebisdithiocarbamate (Maneb) and mixtures thereof with zinc ethylenebisdithiocarbamate or a source of zinc ion such as a zinc salt wherein Maneb can comprise anywhere from 50 to 100 wt. percent of the mixture. Without wishing or intending to be limited by any theory, it is nevertheless believed that the inclusion of zinc components into the present formulations can result in a reduction of crop injury that may come about from Maneb application. Usual commercial sources of Maneb and/or mixtures thereof with Zineb or a zinc ion source include: Manzate D, Maneb 80W (both Du Pont), a Dithane M–45 (Rohm & Haas) all of which are suitable for use in this invention and comprise about 80 wt. percent Maneb alone or associated with Zineb or a source of Zn++ and about 20 wt. percent inert materials, wherein Maneb is in particulate form with a particle size in the range of from about 2 to about 5 microns.

Dithane M–45 consists of 80 wt. percent of a co-ordination product of zinc ion and Maneb (manganese ethylenebisdithiocarbamate) in which the ingredients are Mn++ 16%, Zn++ 2% and ethylenebisdithiocarbamate ion $(C_4H_6N_2S_4)$=62%; and 20 wt. percent inert ingredients. Manzate D consists of 80.0 wt. percent Maneb, wherein the manganese equivalent as metallic is 16.5%; and 20.0 wt. percent inert ingredients.

By the term "hydrocarbon fraction" is meant those hydrocarbon fractions normally used in agricultural application. Broadly, these hydrocarbon fractions may encompass the boiling range from kerosene to heavy lubricating oil cuts and mixtures thereof having a minimum flash point of about 150° F., and desirably boiling in the range of from about 350° F. to above 800° F.

For particular applications it is desirable that such fractions have an aromatics content below about 20% by weight, preferably less than about 6 to 8%. In applying fungicidal organic and/or inorganic materials to growing banana, coffee, olive plants, etc., for example, it is particularly desirable to employ hydrocarbon mineral oils having a boiling point range between about 400 and 750° F., an aromatics content below 15% by weight, a viscosity at 100° F. of between about 60 to 100 SUS, and an unsulfonatable residue of at least 85%, preferably 92% or more by weight.

Suitable representative hydrocarbon fractions that can be used in the preparation of the compositions or formulations of this invention and the characteristic properties of such hydrocarbon fractions are as follows:

(1) Spray Oil B.—This is a spray oil which consists of a blend of a wax distillate fraction from a refined paraffin base crude together with a residual fraction from a refined paraffin base crude. Spray Oil B has a flash point of 365° F., a viscosity at 100° F. of 75.5 SUS, a boiling range of from about 376° F. (at 10 mm. Hg; 5% distillate) to about 496° F. (at 10 mm. Hg), and an unsulfonatable residue of 92%.

(2) Spray Oil C.—This is a spray oil available commercially under the trademark of Orchex 792 and similar to Spray Oil B; it is also a blend of a wax distillate fraction from a refined naphthenic base crude together with a residual fraction from a refined naphthenic base crude. It has a flash point of 350° F., a viscosity at 100° F. of 77.5 SUS, a boiling range of from about 285° F. (at 10 mm.) to about 497° F., and an unsulfonatable residue of 92%.

Other suitable hydrocarbon fractions include white oils, Orchex 696, 792, 796, Texaco 796, etc.

Relative to the dispersant that can be utilized in this invention, it can be generally stated that the function of such dispersant is to aid in the control of the viscosity of the ultimate stable oil-dispersion and form a thixotropic system thereof. Consistent with this purpose, therefore, the preferred dispersant is lecithin, a complex lipoid of the phosphotide type having the general formula of $C_{42}H_{84}O_9PN$. However, lecithin derivatives such as a hydroxylated lecithin like Alcolec Z–6 and a phosphorylated lecithin like Alcolec 110–410 N, etc., can also be used as dispersants in the practice of this invention. In general, it can be said that any other lecithin-type derivative or compound having a structure similar to that of lecithin would be of utility in the practice of the present invention.

The emulsifiers used in the compositions or formulations of this invention can be any of the materials well known to act as emulsifiers or surfactants in the presence of water, provided, however, that such emulsifiers or surfactants are immiscible in oil. Exemplary or preferred emulsifier materials include ethoxylated alkylated phenols such as Triton X–155, Triton X–100, Triton X–45, Triton CF–10, etc., the foregoing Triton X and CF, materials being commercially made available by Rohm & Haas, and sorbitan derivatives such as the Tween 60 type material being provided commercially by Atlas.

Regarding the preparation of the foregoing formulations of this invention, it has been found that, if all the components which collectively constitute the final formulation or stable oil-Maneb dispersion are mixed together, the resultant mixture is a putty-like mass that is unsatisfactory for use in spraying or handling. Accordingly, in order to avoid the foregoing difficulties and to obtain a final thixotropic dispersion of the desired viscosity, it has been found necessary to form a uniform premix of Maneb, lecithin, water, and a major portion at least 50% of the desired oil and then mix with such premix a mixture of the remaining oil and emulsifier.

In a preferred method of formulation, Maneb, lecithin, water and about 80 to about 95% of the oil or hydrocarbon fraction are mixed well in order to form a uniform mixture, and then the remaining 5 to about 20% of the hydrocarbon fraction and the emulsifier (Triton X-155) are mixed and blended with the uniform mixture so as to produce a final thixotropic dispersion system having a viscosity ranging from about 2,000 to about 50,000 cps., preferably from about 3,500 to about 15,000 cps., the viscosity being measured by Brookfield viscosimeter. Formulations with lower than 2,000 cps. generally result in the formation of undesirable precipitates, while high viscosity formulations having viscosities over 50,000 cps. are rather difficult to pump and handle for further dilution with oil to make up the final spray mixture for application of such formulations to banana, coffee, olive plants to increase their yields and to control various fungus diseases on these crops.

Unexpectedly, it has been found that application of the present, stable, thixotropic oil-dithiocarbamate, preferably oil-Maneb, dispersions of this invention having viscosities of between about 2,000 and about 50,000 cps. to banana, coffee, olive, etc., plants result in considerably increased yields of such crops. Nonlimiting, representative examples of the plants or crops for which application of the present formulations is contemplated include: (1) vegetables such as potatoes, tomatoes, celery, carrots, cantaloupes, cucumbers, squash watermellons, beans, peas, onions, garlic, leek, shallots, spinach, lettuce, endive, peppers, chillies, eggplant, cabbages, brussel sprouts, broccoli, cauliflower, kohlrabi, etc.; (2) fruits such as bananas, apples, peaches, apricots, nectarines, citrus fruits (orange, grapefruit, lemons and limes), mangos, papayas, strawberries, grapes, etc.; (3) field crops such as ground nut (peanut), tobacco, hop, sugar beets, turf grass, corn, wheat, barley, rye, cotton, flax, etc.; and (4) ornamentals such as flowers—like roses, dahlia, pansy, zinnia, gladiolus, lily, snapdragon, chrysanthemum, etc. In the examples which appear below, application of previously known oil-Maneb dispersions to (banana) plants which dispersions have not had lecithin and/or water therein in the presently prescribed critical ranges, will be seen to fail to obtain (banana) yields of the magnitude obtained by practice of the present invention.

The thixotropic oil-dithiocarbamate compositions, and formulations of this invention, their methods of preparation, and evaluation of their application in promoting increased (banana) yields, are further illustrated in the following examples, but it is to be understood that such examples should not be construed as limiting the invention in any manner whatsoever.

ture of the remaining oil and emulsifier with the premix; the appearance of each formulation was noted initially after formulation and 21 days later; and the viscosity of each formulation was determined at 80° F. with a Brookfield viscosimeter using a #3 spindle at 6 r.p.m.

A commercial source of Maneb, viz, Manzate D (previously described), made by Du Pont, having a Maneb content of about 80% and 20% inert material, was used. In those examples where Maneb 80W of Du Pont was used, the Maneb content was also about 80%, with 20% inert material. The source of lecithin (dispersant) was Alcolec S; the hydrocarbon fraction used was Spray Oil C; and the emulsifier used was Triton X-155. The registered trademark "Alcolec" represents a line of industrial soy bean lecithin products manufactured by the American Lecithin Company which are yellowish fatlike substances which on hydrolysis with acids or alkalies give fatty acids, glycerophosphoric acid, and a nitrogen-containing base. Alcolec S, a specific "Alcolec" compound, is an unbleached soybean lecithin product comprising a naturally occurring phosphotide (that has been produced from flaked soybeans that have been subsequently refined) and a fatty oil carrier. Characteristics of Alcolec S include: an acetone insolubles content of 62%, minimum; an acid value of 32, maximum; a moisture content of 1%, maximum; a benzene insolubles content of 0.3% maximum; a Gardner color (5% Alcolec S solution in white oil) of 7, maximum; and a Gardner-Holdt viscosity at 77° F. of 200, maximum. Triton X-155 is one of a line of surfactants produced by Rohm & Haas Company and is a liquid alkyl aryl polyether alcohol mixture that is an acid stable detergent and nonionic in character as an emulsifier. It is prepared by reaction of an alkylphenol with ethylene oxide and, as sold, comprises a mixture of alcohols identification of whose components is virtually impossible by ordinary conventional analytical measures.

All mixing was performed with a Hobart mixer.

The purpose of this example was to determine the effects to be derived from varying the ratios of the premix and of the final mixture, and the results obtained are shown in Table I below.

TABLE I

|  | Run Number | | | | |
| --- | --- | --- | --- | --- | --- |
|  | 1 | 2 | 3 | 4 | 5 |
| Composition, weight percent: | | | | | |
| Maneb | 58.7 | 58.7 | 58.7 | 58.7 | 58.7 |
| Hydrocarbon fraction | 39.1 | 39.1 | 39.1 | 39.1 | 39.1 |
| Dispersant | 1.0 | 1.0 | 1.0 | 1.0 | 1.0 |
| $H_2O$ | 1.0 | 1.0 | 1.0 | 1.0 | 1.0 |
| Emulsifier | 0.2 | 0.2 | 0.2 | 0.2 | 0.2 |
| Premix: | | | | | |
| Percent of total HC fraction | 99 | 95 | 90 | 85 | 80 |
| Percent of total dispersant | 100 | 100 | 100 | 100 | 100 |
| Percent of total $H_2O$ | 100 | 100 | 100 | 100 | 100 |
| Percent of total Maneb | 100 | 100 | 100 | 100 | 100 |
| Final Mix: | | | | | |
| Percent of total HC fraction | 1 | 5 | 10 | 15 | 20 |
| Percent of total emulsifier X-155 | 100 | 100 | 100 | 100 | 100 |
| Appearance, Initial | (1) | (2) | (2) | (2) | (2) |
| Appearance after 21 days | (3) | (2) | (2) | (2) | (2) |
| Brookfield viscosity #3 spindle @ 6 r.p.m. c.p.s. @ 80° F.: | | | | | |
| After 1 minute | 46,500 | 6,300 | 4,700 | 4,600 | 3,740 |
| After 10 minutes | 42,000 | 11,400 | 5,200 | 5,800 | 3,540 |
| After 20 minutes | 45,000 | 13,700 | 6,920 | 8,400 | 3,900 |
| After 30 minutes | 43,000 | 14,000 | 8,700 | 10,300 | 4,600 |

[1] Very thick, no good.
[2] Fluid-good.
[3] Very thick like putty, no good.

From the foregoing data, it can be seen that Run No. 1, wherein except for the emulsifier almost all of the other ingredients were mixed together, gave inferior results compared to those obtained in Runs 2–5 wherein more of the hydrocarbon fraction was included in the premix than was the case in Run No. 1.

EXAMPLE 1

In this example, five oil-Maneb formulations were prepared in accordance with the present method of formulation, i.e., forming a uniform premix of Maneb, lecithin, water, and a major portion of oil and then mixing a mix-

EXAMPLE 2

In this example, a number of formulations were prepared in accordance with the procedure described in Example 1 and the viscosities of each of the formulations was measured with a Brookfield viscosimeter. Details of the composition and properties of each formulation together with the results obtained therewith, relative to the stability and viscosity of each formulation, are given in Tables 2A–2C herebelow.

In Table 2A, Examples 1 to 5 show the effects of varying the Spray Oil C content from between 38.1 and 39.85 wt. percent while also varying the water content from between 0.25 and 2.0 wt. percent. In Examples 6 to 11 of this same table are shown the results obtained with two different dispersants that are chemically different from and unrelated to lecithin at concentrations ranging from 0.5 to 2.0 wt. percent and at Spray Oil C concentrations ranging from 38.1 to 39.6 wt. percent. These two different dispersants have been designated as Atlas G–1441 (Exs. 6–8) and Atlas G–1790 (Exs. 9–11), Atlas G–1441 being a polyoxyethylene sorbitol lanolin derivative and Atlas G–1790 being a polyoxyethylene lanolin derivative. As shown in Table 2A, all of the formulations prepared with either Atlas G–1441 or G–1790 were unsatisfactory while all the formulations prepared with Alcolec S were satisfactory.

In Table 2B are shown stability and viscosity data for formulations similar to those described in Example 1 and prepared in the same manner except for the fact that an equivalent source of Maneb, Maneb 80W, was used instead of Manzate D. which was used in Example 1. Run Nos. 1 to 10 show the effects of simultaneously varying the relative concentrations of Spray Oil C between 35.1 and 39.7 wt. percent; of lecithin between 0.5 and 5.0 wt. percent; and of Triton X–155 between 0.05 and 0.3 wt. percent.

In Table 2C is shown the effects of using agar as a dispersant under varying conditions compared with use of lecithin as a dispersant also under varying conditions.

TABLE 2A

| | Run Number | | | | | | | | | | |
|---|---|---|---|---|---|---|---|---|---|---|---|
| | 1 | 2 | 3 | 4 | 5 | 6 | 7 | 8 | 9 | 10 | 11 |
| Compositions, weight percent: | | | | | | | | | | | |
| Maneb 80W (Du Pont) | 58.7 | 58.7 | 58.7 | 58.7 | 58.7 | 58.7 | 58.7 | 58.7 | 58.7 | 58.7 | 58.7 |
| Spray Oil C | 39.35 | 39.6 | 39.85 | 38.6 | 38.1 | 39.6 | 39.1 | 38.1 | 39.6 | 39.1 | 38.1 |
| Lecithin (Alcolec S) | 1.0 | 1.0 | 1.0 | 1.0 | 1.0 | [1]0.5 | [1]1.0 | [1]2.0 | [2]0.5 | [2]1.0 | [2]2.0 |
| H₂O | 0.75 | 0.5 | 0.25 | 1.5 | 2.0 | 1.0 | 1.0 | 1.0 | 1.0 | 1.0 | 1.0 |
| Triton X–155, weight percent | 0.2 | 0.2 | 0.2 | 0.2 | 0.2 | 0.2 | 0.2 | 0.2 | 0.2 | 0.2 | 0.2 |
| Premix: | | | | | | | | | | | |
| Maneb, percent | 100 | 100 | 100 | 100 | 100 | 100 | 100 | 100 | 100 | 100 | 100 |
| Lecithin, percent | 100 | 100 | 100 | 100 | 100 | [1]100 | [1]100 | [1]100 | [2]100 | [2]100 | [2]100 |
| H₂O, percent | 100 | 100 | 100 | 100 | 100 | 100 | 100 | 100 | 100 | 100 | 100 |
| Oil, percent | [3]95 | [3]95 | [3]95 | [3]95 | [3]95 | [3]95 | [3]95 | [3]95 | [3]95 | [3]95 | [3]95 |
| Final Mix: | | | | | | | | | | | |
| Oil, percent | 5 | 5 | 5 | 5 | 5 | 5 | 5 | 5 | 5 | 5 | 5 |
| Emulsifier, percent | [4]100 | [4]100 | [4]100 | [4]100 | [4]100 | [4]100 | [4]100 | [4]100 | [4]100 | [4]100 | [4]100 |
| Brookfield viscosity at 80° F., #3 spindle at 6 r.p.m. taken 10 minutes after preparation: | | | | | | | | | | | |
| After 1 minute rotation | 8,300 | 3,640 | 3,660 | 6,160 | 4,240 | (5) | (6) | (7) | (6) | (7) | |
| After 10 minute rotation | 10,800 | 3,400 | 3,500 | 11,940 | 10,600 | | | | | | |
| After 20 minute rotation | 13,200 | 3,240 | 3,500 | 14,620 | 12,560 | | | | | | |
| After 30 minute rotation | 15,200 | 3,460 | 3,540 | 15,880 | 12,500 | | | | | | |
| Appearance: | | | | | | | | | | | |
| Initial | (8) | (8) | (8) | (8) | (8) | (9) | (9) | (9) | (9) | (9) | (9) |
| After 1 day | (8) | (8) | (8) | | | | | | | | |
| After 2 days | | | | | | | | | | | |
| After 14 days | (8) | (8) | (8) | (8) | | | | | | | |

¹ Atlas G–1441.
² Atlas G–1790.
³ Above +.
⁴ X–155.
⁵ Too thick for viscosity
⁶ Too thick to finish preparation.
⁷ Too thick for viscosimeter (viscosity).
⁸ Good.
⁹ No good.

TABLE 2B

| | Run Number | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Composition weight, percent: | | | | | | | | | | | | | | | |
| Maneb 80W (DuPont) | 58.7 | 58.7 | 58.7 | 58.7 | 58.7 | 58.7 | 58.7 | 58.7 | 58.7 | 58.7 | 58.7 | 58.7 | 58.7 | 58.7 | 58.7 |
| Spray oil C | 39.6 | 39.7 | 39.0 | 38.6 | 38.65 | 38.7 | 38.1 | 38.2 | 38.25 | 35.1 | 35.2 | 35.25 | 39.5 | 39.9 | 39.7 |
| Lecithin (Alcolec S) | 0.5 | 0.5 | 1.0 | 1.5 | 1.5 | 1.5 | 2.0 | 2.0 | 2.0 | 5.0 | 5.0 | 5.0 | 1.0 | 1.0 | 1.0 |
| H₂O | 1.0 | 1.0 | 1.0 | 1.0 | 1.0 | 1.0 | 1.0 | 1.0 | 1.0 | 1.0 | 1.0 | 1.0 | 0.5 | 0.1 | 0.1 |
| Triton X–155 | 0.2 | 0.1 | 0.3 | 0.2 | 0.15 | 0.1 | 0.2 | 0.1 | 0.05 | 0.2 | 0.1 | 0.05 | 0.3 | 0.3 | 0.5 |
| Premix: | | | | | | | | | | | | | | | |
| Maneb, percent | 100 | 100 | 100 | 100 | 100 | 100 | 100 | 100 | 100 | 100 | 100 | 100 | 100 | 100 | 100 |
| Lecithin, percent | 100 | 100 | 100 | 100 | 100 | 100 | 100 | 100 | 100 | 100 | 100 | 100 | 100 | 100 | 100 |
| H₂O, percent | 100 | 100 | 100 | 100 | 100 | 100 | 100 | 100 | 100 | 100 | 100 | 100 | 100 | 100 | 100 |
| Oil, percent | 95 | 95 | 95 | 95 | 95 | ¹95 | 95 | 95 | 95 | 95 | 95 | 95 | 95 | 95 | 95 |
| Final Mix: | | | | | | | | | | | | | | | |
| Oil, percent | 5 | 5 | 5 | 5 | 5 | 5 | 5 | 5 | 5 | 5 | 5 | 5 | 5 | 5 | 5 |
| Triton X–155 | 100 | 100 | 100 | 100 | 100 | 100 | 100 | 100 | 100 | 100 | 100 | 100 | 100 | 100 | 100 |
| Brookfield viscosity at 80° F. #3 spindle at 6 r.p.m. taken 10 minutes after preparation: | | | | | | | | | | | | | | | |
| After 1 minute rotation | (²) | 13,200 | (²) | 8,660 | 4,640 | 2,640 | 6,700 | 3,100 | 2,800 | 7,000 | 5,340 | 5,760 | (³) | 14,040 | |
| After 10 minutes rotation | (²) | 20,000 | (²) | 11,500 | 5,640 | 2,840 | 8,960 | 3,220 | 2,840 | 6,580 | 5,280 | 5,660 | (³) | 14,040 | |
| After 20 minutes rotation | (²) | 20,000 | (³) | 14,200 | 7,880 | 3,040 | 11,360 | 3,320 | 2,920 | 6,280 | 5,320 | 5,640 | (³) | 14,020 | |
| After 30 minutes rotation | (²) | 20,000 | (³) | 1,600 | 10,600 | 3,260 | 13,360 | 3,440 | 2,920 | 6,160 | 5,320 | 5,580 | (³) | 14,040 | |
| Appearance: | | | | | | | | | | | | | | | |
| Initial | (⁴) | (⁴) | (⁵) | (⁴) | (⁴) | (⁴) | (⁴) | (⁴) | (⁷) | (⁸) | (⁶) | (⁶) | (⁵) | (⁴) | (⁹) |
| After 1 day | | | | | | | | | | | | | | | |
| After 2 Days | | | | | | | | | | | | | | | |
| After 7 Days | | | | | | | | | | | | | | | |
| After 14 Days | (⁵) | (⁴) | (⁵) | (⁴) | (⁴) | (¹⁰) | (⁴) | (¹⁰) | (¹⁰) | (⁴) | (¹⁰) | (¹⁰) | (⁵) | (⁴) | (⁵) |

¹ Above plus.
² Too thick. for viscosity.
³ Too thick.
⁴ Good.
⁵ NG.
⁶ Too Thin.
⁷ Good thin.
⁸ NG too thin.
⁹ NG too thick to make.
¹⁰ No good solid precipitated.

TABLE 2C

| | Run Number | | | | | | | | |
|---|---|---|---|---|---|---|---|---|---|
| | 1 | 2 | 3 | 4 | 5 | 6 | 7 | 8 | 9 |
| Composition, weight percent: | | | | | | | | | |
| Maneb 80W (Du Pont) | 58.7 | 58.7 | 58.7 | 58.7 | 58.7 | 58.7 | 58.7 | 58.7 | 58.7 |
| Spray oil C | 39.1 | 39.6 | 38.6 | 38.1 | 39.09 | 38.6 | 37.1 | 37.6 | 37.5 |
| Lecithin (Alcolec S) | | | | | | 0.5 | 1.5 | 2.0 | 3.0 |
| Agar | 1.0 | 0.5 | 1.5 | 2.0 | 0.01 | | | | |
| H₂O | 1.0 | 1.0 | 1.0 | 1.0 | 2.0 | 2.0 | 2.5 | 1.5 | 1.0 |
| Triton X-155 | 0.2 | 0.2 | 0.2 | 0.2 | 0.2 | 0.2 | 0.2 | 0.2 | 0.2 |
| Premix: | | | | | | | | | |
| Maneb, percent | 100 | 100 | 100 | 100 | 100 | 100 | 100 | 100 | 100 |
| Agar, percent | 100 | 100 | 100 | 100 | 100 | 100 | 100 | 100 | 100 |
| H₂O, percent | 100 | 100 | 100 | 100 | 100 | 100 | 100 | 100 | 100 |
| Oil, percent | [1]95 | [1]95 | [1]95 | [1]95 | [1]95 | [1]95 | [1]95 | [1]95 | [1]95 |
| Final Mix: | | | | | | | | | |
| Oil, percent | 5 | 5 | 5 | 5 | 5 | 5 | 5 | 5 | 5 |
| Triton X-155, percent | 100 | 100 | 100 | 100 | 100 | 100 | 100 | 100 | 100 |
| Brookfield viscosity at 80° F. #3 spindle at 6 r.p.m. taken 10 minutes after preparation | [2] | [2] | [2] | [2] | [2] | | | | |
| After 1 minute rotation | | | | | | 15,000 | 2,800 | 6,240 | 5,240 |
| After 10 minute rotation | [3] | [3] | [3] | [3] | [3] | 20,000 | 4,760 | 9,600 | 5,100 |
| After 20 minute rotation | | | | | | 20,000 | 4,920 | 10,080 | 5,600 |
| After 30 minute rotation | | | | | | 20,000 | 4,800 | 11,560 | 6,000 |
| Appearance: | | | | | | | | | |
| Initial | | | | | | | | | |
| After 1 day | | | | | | [4] | [5] | [6] | [6] |
| After 2 days | | | | | | [4] | [7] | [6] | [6] |
| After 7 days | | | | | | [4] | [8] | [6] | [6] |
| After 14 days | | | | | | [4] | [8] | [6] | [9] |

[1] Above plus.
[2] No good.
[3] Too thick to finish preparation.
[4] Good thick.
[5] Thin.
[6] Good.
[7] No good solid.
[8] No good solid precipitate.
[9] Good slight precipitate.

In order to determine the effects of each of the three additives two of these 3 variables were held constant and one permitted to vary in different sequences in the following Examples 3–5. Then, in Examples 6–8, two of the three variables were permitted to vary and one held constant in different sequences. The materials used and general procedure by which the formulations of Examples 3–8 were prepared were the same as that previously described in Example 1.

EXAMPLE 3

In this example, the effect of varying the water concentration was determined, the concentrations of emulsifier (Triton X–155) and dispersant (lecithin) having been held constant. The concentration of each additive variable and the results obtained are shown below in Table 3.

TABLE 3.—EFFECT OF VARYING H₂O CONSTANT, X-155 AND LECITHIN CONSTANT

| | | | | Properties | |
|---|---|---|---|---|---|
| | X-155 | H₂O | Lecithin | Viscosity | Stability |
| Run Number: | | | | | |
| 1 | 0.2 | 0 | 1.0 | 1,500 | [1] |
| 2 | 0.2 | 0.25 | 1.0 | 3,660 | [2] |
| 3 | 0.2 | 0.5 | 1.0 | 3,640 | [2] |
| 4 | 0.2 | 0.75 | 1.0 | 8,300 | [2] |
| 5 | 0.2 | 1.0 | 1.0 | 6,300 | [2] |
| 6 | 0.2 | 1.5 | 1.0 | 6,160 | [2] |
| 7 | 0.2 | 2.0 | 1.0 | 4,240 | [2] |

[1] No good—settled.
[2] Good.

The foregoing data show that some water is essential; that from about 0.25 to about 2.0% water is satisfactory at 0.2% Triton X–155 and 1.0% lecithin concentrations; and that a preferred range of water concentration is from about 0.25 to about 1.5%.

EXAMPLE 4

In this example, the effect of varying the lecithin concentration was determined, the concentrations of Triton X–155 and water having been held constant. The concentration of each additive variable and the results obtained are shown below in Table 4.

TABLE 4.—EFFECT OF VARYING LECITHIN, X-155 AND H₂O CONSTANT

| | | | | Properties | |
|---|---|---|---|---|---|
| | X-155 | H₂O | Lecithin | Viscosity | Stability |
| Run Number: | | | | | |
| 1 | 0.2 | 1.0 | 0 | 65,000 | [1] |
| 2 | 0.2 | 1.0 | 0.1 | 100,000 | [1] |
| 3 | 0.2 | 1.0 | 0.25 | 100,000 | [2] |
| 4 | 0.2 | 1.0 | 0.5 | 84,000 | [2] |
| 5 | 0.2 | 1.0 | 0.5 | [1] | [3] |
| 6 | 0.2 | 1.0 | 0.75 | 37,600 | [4] |
| 7 | 0.2 | 1.0 | 1.0 | 8,000 | [5] |
| 8 | 0.2 | 1.0 | 1.5 | 8,660 | [5] |
| 9 | 0.2 | 1.0 | 2.0 | 6,800 | [5] |
| 10 | 0.2 | 1.0 | 5.0 | 2,880 | [6] |
| 11 | 0.2 | 1.0 | 5.0 | 7,000 | [5] |

[1] Too thick.
[2] No good—too thick.
[3] Good on standing.
[4] Good—thick.
[5] Good
[6] No good—oil separation.

The foregoing data show that some lecithin is required to give a satisfactory oil-Maneb formulation or blend of usable qualities; that a range of about 0.75 to 5.0% lecithin is preferable; and that from about 1.0 to about 2.0% lecithin is most preferable; with concentrations of 0.2% Triton X–155 and 1.0% water.

EXAMPLE 5

In this example, the effect of varying the emulsifier (Triton X–155) concentration was determined, the concentrations of water and lecithin having been held constant. The concentration of each additive variable and the results obtained are shown in Table 5.

TABLE 5.—EFFECT OF VARYING TRITON X-155, H₂O AND LECITHIN CONSTANT

| | | | | Properties | |
|---|---|---|---|---|---|
| | X-155 | H₂O | Lecithin | Viscosity | Stability |
| Run Number: | | | | | |
| 1 | 0.1 | 1.0 | 1.0 | 1,680 | [1] |
| 2 | 0.15 | 1.0 | 1.0 | 9,000 | [2] |
| 3 | 0.2 | 1.0 | 1.0 | 6,300 | [2] |
| 4 | 0.3 | 1.0 | 1.0 | 100,000 | [3] |
| 5 | 0.3 | 1.0 | 1.0 | 100,000 | [4] |

[1] No good.
[2] Good.
[3] Too thick.
[4] No good—too thick.

The foregoing data shown that the quality of the final oil-Maneb formulation is very sensitive to small variations in the Triton X–155 concentration. For example, with only 0.1% Triton X–155, the viscosity of the finished or final formulation was too low and the Maneb settled out rapidly.

EXAMPLE 6

In this example, the effect of varying the Triton X–155 and water concentrations simultaneously was determined, the concentrations of lecithin having been held constant. The concentration of each additive variable and the results obtained are shown below in Table 6.

TABLE 6.—EFFECT OF VARYING X-155 AND H₂O, LECITHIN CONSTANT

|  |  |  |  | Properties | |
|---|---|---|---|---|---|
|  | X-155 | H₂O | Lecithin | Viscosity | Stability |
| Run Number: |  |  |  |  |  |
| 1 | 0 | 2.5 | 1.0 | 1,020 | (1) |
| 2 | 0 | 5.0 | 1.0 | 1,660 | (1) |
| 3 | 0.3 | 0.5 | 1.0 | (2) | (3) |
| 4 | 0.3 | 0.1 | 1.0 | 14,040 | (4) |
| 5 | 0.5 | 0.1 | 1.0 | (2) | (5) |

1 No good—settled.
2 Too thick.
3 No good—too thick.
4 Good.
5 No good—too thick.

From the foregoing data, it can be seen that it is possible to make a satisfactory thixotropic, stable, oil-Maneb dispersion with a water concentration of 0.1% by increasing the Triton X–155 concentration to 0.3% (with a constant lecithin level of 1.0%).

EXAMPLE 7

In this example, the effect of varying the water and lecithin concentrations simultaneously was determined, the concentration of Triton X–155 having been held constant. The concentration of each additive variable and the results obtained are shown below in Table 7.

TABLE 7.—EFFECT OF VARYING H₂O AND LECITHIN, X-155 CONSTANT

|  |  |  |  | Properties | |
|---|---|---|---|---|---|
|  | X-155 | H₂O | Lecithin | Viscosity | Stability |
| Run Number: |  |  |  |  |  |
| 1 | 0.2 | 2.0 | 0.5 | 15,000 | (1) |
| 2 | 0.2 | 2.5 | 1.5 | 2,800 | (2) |
| 3 | 0.2 | 1.5 | 2.0 | 6,240 | (3) |
| 4 | 0.2 | 1.0 | 3.0 | 5,240 | (4) |

1 Good.
2 No good—settled.
3 Good, slight.
4 Settling.

The foregoing data show that successful formulation is possible with a lecithin level of from 0.5 to 3.0% provided that the water concentration remains below 2.0% (with a constant Triton X–155 level of 0.2%).

EXAMPLE 8

In this example, the effect of varying the Triton X–155 and lecithin concentrations simultaneously was determined, the water concentration having been held constant. The concentration of each additive variable and the results obtained are shown below in Table 8.

TABLE 8.—EFFECT OF VARYING X-155 AND LECITHIN, H₂O CONSTANT

|  |  |  |  | Properties | |
|---|---|---|---|---|---|
|  | X-155 | H₂O | Lecithin | Viscosity | Stability |
| Run Number: |  |  |  |  |  |
| 1 | 0.1 | 1.0 | 0.5 | 13,200 | (1) |
| 2 | 0.2 | 1.0 | 0.5 | (2) | (1) |
| 3 | 0.2 | 1.0 | 1.0 | 6,300 | (1) |
| 4 | 0.3 | 1.0 | 1.0 | (3) | (3) |
| 5 | 0.2 | 1.0 | 1.5 | 8,660 | (1) |
| 6 | 0.15 | 1.0 | 1.5 | 4,540 | (1) |
| 7 | 0.1 | 1.0 | 1.5 | 2,640 | (4) |
| 8 | 0.1 | 1.0 | 2.0 | 3,100 | (4) |
| 9 | 0.2 | 1.0 | 2.0 | 6,800 | (4) |
| 10 | 0.05 | 1.0 | 2.0 | 2,800 | (4) |
| 11 | 0.05 | 1.0 | 5.0 | 5,760 | (4) |
| 12 | 0.1 | 1.0 | 5.0 | 5,340 | (4) |
| 13 | 0.2 | 1.0 | 5.0 | 7,000 | (1) |

1 Good.
2 Initially too thick.
3 Too thick.
4 No good—settled.

The foregoing data show that varying Triton X–155 concentrations below about 0.15% by weight gave poor quality oil-Maneb formulations even with lecithin concentrations ranging from about 0.5 to about 5.0% by weight at constant water concentrations of 1.0%. Also apparent from the foregoing data is the fact that variations in Triton X–155 concentration have a marked effect upon the properties of the finished formulation whereas the variations in lecithin concentration are of much less significance.

EXAMPLE 9

In this example, field test data are given showing increased banana yields with thixotropic, stable, oil-Maneb-containing formulations of the present invention compared to banana yields obtained with straight oil and prior art formulations. Yields are defined herein in terms of weight and numbers of marketable bananas for a given growing period. Total weight and number of bananas were also increased, which includes unmarketable bananas.

The data were derived from application of the aforesaid formulations to two-acre banana test plots of commercial banana plantations by means of conventional spray equipment, e.g., a Solo Port 70 mistblower, utilizing one-half pound of Maneb per two gallons of oil per acre for the present formulations, 1.6 pounds of Maneb per two gallons of oil per acre for the known or old formulations, and two gallons of straight oil (i.e., Spray Oil B and C, respectively) per acre. The total volume of oil formulations applied was about 1.5 gallons of diluted formulation per acre. The old oil-Maneb-water emulsion was applied at a rate of about 100 gallons per acre. The compositions of these various oil-Manganese containing formulations is contained in Table 9–A and the results of the field tests are shown in Table 9–B herebelow.

TABLE 9-A.—OIL FORMULATIONS WITH MANEB, ZINEB AND Mn NUODEX

| (1) Present Formulations | A | B | C | D |
|---|---|---|---|---|
| Composition, weight percent: |  |  |  |  |
| Dithane M-22 (Rohm & Haas) Maneb | 59.9 |  | 1 58.7 | 29.95 |
| Spray oil C | 39.1 | 90.44 | 39.1 | 39.1 |
| Lecithin | 1.0 |  | 1.0 | 1.0 |
| Mn Naphthenate, 6% Mn 94% naphthenic acid of Nuodex |  | 9.56 |  |  |
| H₂O |  |  | 1.0 |  |
| Zineb, zinc ethylene bisdithiocarbamate |  |  |  | 29.95 |
| Triton X-155 |  |  | 0.2 |  |
| Stability of formulation | (2) | (3) | (3) | (2) |

(2) Prior art formulation

| Composition, weight percent |  |  |
|---|---|---|
|  | 4 Light |  |
| Dithane M-22 (Rohm & Haas) Maneb | 19.65 |  |
| Spray oil C | 78.19 |  |
| Triton X-45, isooctyl phenyl polyethoxy ethanol, a nonionic surfactant | 1.28 |  |
| Marasperce C, a highly purified calcium lignosulfonate; a dispersant powder; anionic | 0.88 |  |

1 Manzate D of Du Pont.
2 No good, precipitate settled after 1-2 days.
3 Good.
4 40 gallons of this mixture are diluted with water to make up 100 gallons of spray.

TABLE 9-B.—FIELD TESTS SHOWING BANANA YIELD INCREASES WITH OIL-MANEB FORMULATIONS DESCRIBED HEREIN [1] COMPARED TO STRAIGHT OIL AND PRIOR ART [2] FORMULATIONS [3]

| | | | Treatment | | | | | | | | | |
|---|---|---|---|---|---|---|---|---|---|---|---|---|
| | | | A | | B | | C made with spray oil C | | C made with spray oil B | | Prior art formulation | | D | |
| Test Number | Spray oil C yield, lbs./ 2 acres | Spray oil B yield, lbs./ 2 acres | Yield, lbs./ 2 acres | Percent increase vs. spray oil C | Yield, lbs./ 2 acres | Percent increase vs. spray oil B | Yield, lbs./ 2 acres | Percent increase vs. spray oil C prior art | Yield, lbs./ 2 acres | Percent increase vs. spray oil B | Yield, lbs./ 2 acres | Percent increase vs. spray oil C | Yield, lbs./ 2 acres | Percent increase vs. spray oil C |
| 1 | 7,073 | | 9,046 | 28 | | | | | | | | | 8,702 | 23 |
| 2 | 2,159 | | | | | | 2,863 | 33 | | | | | | |
| 3 | 2,678 | | | | | | 3,282 | 23 | | | | | | |
| 4 | 10,405 | | | | | | 11,223 | 8 | | | | | | |
| 5 | 13,785 | | | | | | 15,324 | 11 | | | | | | |
| 6 | | 7,452 | | | | | 13,481 | 81 | 20,300 | 172 | | | | |
| 7 | | 20,522 | | | | | 23,710 | 16 | 13,762 | −33 | | | | |
| 8 | | 3,497 | | | | | 5,945 | 70 | 7,332 | 110 | | | | |
| 9 | | 2,722 | | | | | 3,418 | 26 | 4,482 | 64 | | | | |
| 10 | 15,578 | | | | 17,122 | 10 | 19,318 | 24, 20 | | | 16,141 | 4 | | |
| 11 | 16,844 | | | | 15,276 | −9 | 22,168 | 32, 45 | | | 15,330 | −9 | | |
| 12 | 40,383 | | | | 39,560 | −2 | 46,278 | 15, 33 | | | 34,785 | −14 | | |
| 13 | 5,658 | | | | 3,312 | −41 | 6,102 | 8, −7 | | | 6,534 | 15 | | |
| 14 | 22,457 | | | | 25,661 | 14 | 26,757 | 19, 28 | | | 20,840 | −7 | | |
| 15 | 7,698 | | | | 11,174 | 45 | 7,058 | −8, −15 | | | 8,116 | 5 | | |
| Average of all Tests | | | | +28 | | +2.8 | | +26 +17 | | +78 | | +1.0 | | +23 |

[1] B, A, C, D.
[2] Prior art.
[3] Yields are expressed as marketable bananas.

From the foregoing data, the following conclusions can be drawn:

(1) An oil-Maneb blend containing only lecithin as a stabilizer (Formulation A) increases banana yields, but this material is not satisfactory for commercial use since a hard, solid precipitate settles out after 1-2 days. Nearly constant agitation is required to maintain a homogeneous system.

(2) Maneb is an essential ingredient since another manganese compound (Mn naphthenate) dispersed in oil (Formulation B) was ineffective in increasing banana yields.

(3) The prior art oil-Maneb formulation plots were not significantly different from Spray Oil C in yields of bananas.

(4) The oil-Maneb formulation of this invention (Formulation C) gives significantly greater yields of bananas compared to both straight oil and the prior art formulations.

(5) It has been previously noted that oil-Zineb blends do not have any effect on banana yields. But a mixture of Maneb with Zineb (Formulation D) did increase banana yields, and it is thought that comparable formulations containing Maneb and another source of zinc ion (such as Dithane M-45) would probably afford equivalent results.

While the foregoing description of the preferred embodiments has essentially been concerned with (1) thixotropic, stable oil-Maneb-containing formulations in which there are present three essential additives; lecithin, an emulsifier, and water, all within carefully prescribed limits as to promote a final dispersion viscosity of about 2,000 to about 50,000 cps. at about 60° to about 120° F.; (2) the methods of preparing the formulations of (1); and (3) the method of using the formulations of (1) to increase banana, coffee, olive, etc., yields, it is within the purview and contemplation of this invention to incorporate other materials or ingredients into the ultimate thixotropic oil-Maneb formulation to accommodate other functions to which the thus-promoted oil-Maneb formulations might also be put. Such additional ingredients as DDT, Sevin, Atrazine, Malathion and/or heptachlor, etc., most of which are commercial pesticides having registered trademarks, might be incluided in the formulation of this invention by incorporation into the premix prior to preparation of the ultimate formulation.

Moreover, while the viscosities of the final formulations of this invention have been disclosed as being preferably within the range of about 2,000 to about 50,000 cps. at 80° F., nevertheless it is intended that other formulations of the same nature and composition having this same range of viscosities within temperatures ranging from about 60° F. to about 120° F. are within the purview and contemplation of this invention.

In addition, while preferred effective amounts of manganese-containing ethylenebisdithiocarbamate or mixtures thereof with a suitable Zn source, preferably manganese ethylenebisdithiocarbamate, in the preferred formulations of this invention consist of from about 0.2 to about 0.6 pound of Maneb or Maneb mixture with Zineb and a Zn++ source per 1 to 2 gallons of oil per acre of banana or other crop of test plant, it is understood that variations in such amount may be made by those of ordinary skill in the art in view of the above description without departing from the scope of this invention.

It is to be understood that the formulations of this invention are contemplated to comprise oil-Maneb-containing concentrates, systems, or dispersions as well as the diluted forms thereof that are applied to the given crop or crops, e.g., in the form of a (directed) spray, or other physical form such as a mist, etc.

It is also to be understood that the source of zinc ion such as the zinc salt previously indicated includes a wide range and variety of such salts including: zinc sulfate, zinc chloride, zinc acetate, zinc naphthenate, zinc salts of ethylene-diaminetetraamine, zinc Rayplex salts (e.g., natural polyflavonoid type chelates). It is also understood, as previously indicated, that the function of the zinc salts, also as now understood, is to reduce the phytotoxicity which is induced by Maneb; however, such theory is not intended or desired to limit or otherwise impede the scope of the present invention.

It should be understood therefore, that the above description is merely illustrative of preferred embodiments and specific examples of the present invention, and that, in all of which embodiments and examples, variations, such as, e.g., those previously described, may be made by those skilled in the art without departing from the spirit and purview thereof, the invention being defined by the following claims:

What is claimed is:

1. A formulation composition for improving the yield of bananas, said composition consisting essentially of from 35 to 65% by weight of a fungicide compound selected from the group consisting of manganese ethelenebisdithiocarbamate and mixtures of manganese ethylenebisdithiocarbamate with zinc salts of ethylenebisdithiocarbamate wherein said manganese ethylenebisdithiocarbamate forms at least 50% by weight of said mixture; 20–65% by weight of a fungistat hydrocarbon oil fraction having a boiling range from 350° F. to 800° F., an aromatics content below 20% by weight and a flash point of at least 150° F.; 0.5 to 10% by weight of a lecithin containing compound selected from the group consisting of lecithin, hydroxylated lecithin, and phosphorylated lecithin; 0.1 to 1% by weight of an emulsifier and 0.1 to 2.0% by weight of water, whereby the said composition has a viscosity in the range of from 2,000 cps. to 50,000 cps. at a temperature of between 60° and 120° F.

2. A composition according to claim 1 wherein said hydrocarbon fraction is an agricultural spray oil having a viscosity at 100° F. of between 60 and about 200 SUS and an unsulfonatable residue of at least 92% by weight of said oil, said lecithin containing compound is lecithin and said emulsifier is alkylated aryl polyether alcohol.

3. A method for preparing a stable thixotropic composition defined in claim 1 comprising the steps of first mixing said dithiocarbamate, said lecithin containing compound, said water and a major portion of said hydrocarbon fraction to form a substantially uniform mixture; separately mixing said emulsifier with the remainder of said oil to form a second mixture followed by mixing said uniform mixture with said second mixture to form said thixotropic composition having a viscosity from about 2,000 cps. to about 50,000 cps. at a temperature ranging from 60° to 120° F.

4. A method according to claim 3 wherein 80 to about 90% of the oil of the hydrocarbon fraction is mixed in the first step and the remaining 5 to about 20% of the hydrocarbon fraction is mixed with the emulsifier in the second step.

5. A method of increasing banana yield comprising the steps of compounding a stable thixotropic composition as defined in claim 1 and treating banana plants with an effective amount of said composition.

References Cited

UNITED STATES PATENTS

| | | | |
|---|---|---|---|
| 1,934,005 | 11/1933 | Rewald | 252—6 |
| 2,465,335 | 3/1949 | Burkhard | 424—355 |
| 2,516,477 | 7/1950 | Moberly | 424—173 |
| 2,870,058 | 1/1959 | Loder | 424—286 |
| 2,974,156 | 3/1961 | Sobatzki | 424—286 |
| 3,085,042 | 4/1963 | Luginbuhl | 424—286 |
| 3,171,779 | 3/1965 | McCoy et al. | 424—78 |
| 3,184,300 | 5/1965 | Lemin et al. | 71—97 |
| 3,210,394 | 10/1965 | Nemec et al. | 424—286 |
| 3,379,610 | 4/1968 | Lyon et al. | 424—286 |

FOREIGN PATENTS

| | | | |
|---|---|---|---|
| 851,250 | 10/1960 | Great Britain | 71—93 |

OTHER REFERENCES

Klein: "Effects of Fungicides, Oil and Fungicide-Oil-Water Emulsions, Etc.," Phytopathology, vol. 51 (1961), pp. 294–297.

Calpouzos et al.: "Relation of Petroleum Oil Composition to Phytotoxicity, Etc." C.A. 55, p. 25135 (1961).

LEWIS GOTTS, Primary Examiner

G. HOLLRAH, Assistant Examiner

U.S. Cl. X.R.

11—93, 101, A.D. (soft copy); 424—225, 286, 287, 365